(12) United States Patent
Fodor et al.

(10) Patent No.: US 10,555,248 B2
(45) Date of Patent: Feb. 4, 2020

(54) METHOD, SYSTEM AND DEVICES FOR ENABLING A NETWORK NODE TO PERFORM A RADIO OPERATION TASK IN A TELECOMMUNICATION NETWORK

(71) Applicant: Telefonaktiebolaget LM Ericsson (publ), Stockholm (SE)

(72) Inventors: Gabor Fodor, Hässelby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 15/522,236

(22) PCT Filed: Mar. 30, 2016

(86) PCT No.: PCT/EP2016/056904
§ 371 (c)(1),
(2) Date: Apr. 26, 2017

(87) PCT Pub. No.: WO2017/167358
PCT Pub. Date: Oct. 5, 2017

(65) Prior Publication Data
US 2018/0192357 A1 Jul. 5, 2018

(51) Int. Cl.
*H04W 48/16* (2009.01)
*H04L 5/14* (2006.01)
(Continued)

(52) U.S. Cl.
CPC ............... *H04W 48/16* (2013.01); *H04L 5/14* (2013.01); *H04W 24/08* (2013.01); *H04W 36/0055* (2013.01); *H04W 48/20* (2013.01)

(58) Field of Classification Search
None
See application file for complete search history.

(56) References Cited

U.S. PATENT DOCUMENTS

2010/0120434 A1* 5/2010 Hasegawa ............. H04W 36/02
455/436
2013/0143572 A1* 6/2013 Kang .................... H04W 36/08
455/437
(Continued)

FOREIGN PATENT DOCUMENTS

EP 2930994 A1 10/2015
WO 2015046911 A1 4/2015

OTHER PUBLICATIONS

Thilina, Karaputugala M. et al., "Medium Access Control Design for Full Duplex Wireless Systems: Challenges and Approaches", IEEE Communications Magazine, vol. 53, Issue 5, May 14, 2015, 112-120.
(Continued)

*Primary Examiner* — Otis L Thompson, Jr.
(74) *Attorney, Agent, or Firm* — Murphy, Bilak & Homiller, PLLC

(57) ABSTRACT

Method of enabling a second network node to perform a radio operation task based on measurement data related to in-band full duplex communication and half duplex communication performed by the first network node and provided to the second network node, wherein the traffic measurement data comprises at least one of the number of active channels used for communication in the first cell and the physical channel usage or utilization of channels used for communication in the first cell.

21 Claims, 8 Drawing Sheets

(51) Int. Cl.
*H04W 48/20* (2009.01)
*H04W 36/00* (2009.01)
*H04W 24/08* (2009.01)

(56) References Cited

U.S. PATENT DOCUMENTS

| | | | |
|---|---|---|---|
| 2014/0010106 A1* | 1/2014 | Yoshimura | H04W 24/08 370/253 |
| 2014/0211757 A1* | 7/2014 | Pereira | H04W 36/0055 370/331 |
| 2015/0133081 A1* | 5/2015 | Griot | H04L 12/1435 455/407 |
| 2016/0029231 A1 | 1/2016 | Kazmi et al. | |

OTHER PUBLICATIONS

Xie, Xiufeng et al., "Does Full-Duplex Double the Capacity of Wireless Networks?", IEEE Conference on Computer Communications, 2014, 253-261.

* cited by examiner

METHOD, SYSTEM AND DEVICES FOR ENABLING A NETWORK NODE TO PERFORM A RADIO OPERATION TASK IN A TELECOMMUNICATION NETWORK

TECHNICAL FIELD

The present invention generally relates to performing a radio operation task in a telecommunication network and, more specifically, to performing the radio operation task based on traffic measurement data.

BACKGROUND

Recent advances in wireless receiver design make it possible that a wireless node transmits and receives communication signals using overlapping or even identical frequency resources for reception and transmission simultaneously. This type of full duplex, FD, communication is referred to as in-band FD or "true FD" or simply FD communication. In contrast, a wireless node can typically simultaneously transmit and receive radio signals separated in frequency, this latter communication mode is also referred to as (frequency division) "full duplex", or simply frequency division duplex, FDD, communication.

In the present description, the term FD is used to refer to the in-band FD communication case and FDD to refer to a communication setup that uses separate frequency channels for the transmitted and received radio signals.

Recent studies indicate that FD communication may be able to (up to) double the spectral efficiency, although this upper bound is typically not reachable in practice. FD communication, however, has the potential to increase the spectral efficiency due to the progress in designing self-interference, SI, cancellation receivers that can reach up to 80-90 dB or even higher SI cancellation capabilities.

The transmission modes in FD communication systems can be categorized in terms of the involved nodes and their capabilities. Bidirectional full duplex, BFD, communication involves a pair of FD capable nodes that send and receive signals to one another on the same frequency channel at the same time. In contrast, three-node FD, TNFD, communication is a type of communication in which a FD capable node communicates with two other, not necessarily FD capable, nodes such that the FD capable node transmits and receives signals from/to the non-FD capable nodes on the same frequency channel simultaneously.

Currently, the 3rd Generation Partnership Project, 3GPP, Long Term Evolution, LTE, system defines so called global procedures to enable network nodes, such as eNodeB's, eNB, to exchange information regarding resource utilization, cell-wise load information, handover request, radio link failure, RLF, eNB configuration and other aspects that are of importance for the global operation of a cellular network. This is described in 3GPP Technical specification TS 36.423. To this end, LTE systems use the X2 interface and the X2 application protocol (X2AP) with associated standardized information elements.

For example, one of the functions of the X2AP according to 3GPP TS 36.423 is load management. This function is used by eNB's to indicate resource status, overload and traffic load to each other. Specifically, the Radio Resource Status information element, IE, indicates the usage of the Physical Layer, PHY, Resource Blocks, PRBs, in Downlink, DL, and Uplink, UL, including DL Guaranteed Bit Rate, GBR, usage, non-GBR usage and total PRB usage.

In a telecommunication network having network nodes which are capable of in-band full duplex communication, an increase in interference issues is to be expected. This, because in an FD communication network, nodes and/or User Equipment, UE, may simultaneously transmit and receive signals at the same frequency.

The above referenced interference may manifest itself in different ways. For example, intra-cell interference wherein nodes transmitting signals at the same frequency, in the same cell, at the same time can cause interference at the nodes which are receiving those signals. As such, the probability of increased interference experienced by UE's in the same cell, or in different cells, increases in case of FD communications.

SUMMARY

It is an object to provide for methods of enabling a second network node to perform at least one radio operation task based on traffic measurement data, thereby ensuring that the second network node is able to decide what kind of radio operation task is suitable.

It is another object to provide for a first network node, a second network node, a telecommunication network and a non-transitory computer-readable storage medium involved within the methods as presented.

In a first aspect, there is provided a method of enabling a second network node serving a second plurality of User Equipment, UE's, in a second cell of a telecommunication network to perform at least one radio operation task involving a UE among said second plurality of UE's, said telecommunication network further comprising a first network node serving a first plurality of UE's in a first cell, wherein said first network node is capable of in-band full duplex, FD, communication and half duplex, HD, communication with any of said first plurality of UE's, wherein in-band FD communication being the simultaneous transmission and reception of signals on a same frequency.

The method comprises the step of measuring, by said first network node, traffic measurement data related to in-band full duplex, FD, communication between any of said first plurality of UE's in said first cell and said first network node and measuring, by said first network node, traffic measurement data related to half duplex, HD, communication between any of said first plurality of UE's in said first cell and said first network node, wherein said traffic measurement data comprises, for example, at least one of number of active channels used for communication in said first cell and physical channel usage or utilization of channels used for communication in said first cell.

Subsequently, it comprises the step of providing, by said first network node, said traffic measurement data related to said in-band full duplex, FD, communication and said half duplex, HD, communication to said second network node enabling said second network node to use said data for performing said at least one radio operation task involving said UE among said second plurality of UE's in said second cell, and receiving, by said second network node, from said first network node, said traffic measurement data related to relating to said in-band full duplex, FD, communication and said half duplex, HD, communication.

Finally, the method comprises the steps of determining, by said second network node, based on said received traffic measurement data said least one UE among said second plurality of UE's in said second cell for said radio operation task, and performing, by said second network node, said radio operation task for said at least one UE among said second plurality of UE's.

The method is at least based on the insight that the second network node is able to perform accurate and useful radio operation tasks in case the second network node is provided with traffic measurement data related to the first cell, i.e. any of the least one of number of active channels used for communication in said first cell and physical channel usage or utilization of channels used for communication in said first cell.

A further insight is that in future communication networks in which network nodes are able to communicate following the in-band Full Duplex principle, the likelihood of creating interference at the first network node and/or at the UE's served by the first network node and/or the second network node and the interference power density, increases significantly. This is because in-band Full Duplex supports simultaneous transmission and reception of signals on a same frequency and, consequently, the total emitted power increases as compared with that of a single transmission. As such, it was found to provide other network nodes in a same telecommunication network with corresponding traffic measurement data. Based on this data, a network node decides to perform radio operation tasks for, for example, mitigating interference, reducing likelihood of interference, switching over UE's from one network node to another, etc.

In accordance with the present disclosure, a network node may be any of a radio base station, an access point server, a remote radio head, an evolved node B, or a service running in the internet cloud. In the latter, the providing and receiving steps may be performed by actual hardware present in, for example, a base station while the other method steps may be performed by cloud computing.

Further, the present description defines that the traffic measurement data comprises, for example, at least one of the number of active channels used for communication in the first cell and the physical channel usage or utilization of channels used for communication in the first cell. More weight is contributed to these aspects in case in-band FD communication is used in a particular cell. That is, it is likely that the number of active channels and the usage or utilization of these channels is becoming a more and more important factor for determining, for example, adequately performing radio operation tasks.

In accordance with the present disclosure, the measurements can be done typically on longer time scale such as averaged over radio frame or plurality of radio frames, e.g. 50-100 ms. However, the examples described herein are also applicable for traffic measurements performed on shorter time scale such as on symbol, time slot or subframe basis or even on a shorter time scale. The FD and HD traffic measurements can be done by the first radio network node during the same time period or during partly overlapping time or during different time periods, i.e. non-overlapping time period.

Presently, two measurement steps are defined in which the first network node measures traffic measurement data related to in-band full duplex, FD, communication between any of the first plurality of UE's in the first cell and the first network node and related to half duplex, HD, communication between any of the first plurality of UE's in the first cell and the first network node. In the present context, the step of measuring may be performed in at least two different ways.

In a first way, the first network node comprises sensors, or other type of hardware, for performing the measurements in a physically manner. That is, the sensors, or other type of hardware, measure the traffic measurement data related to the FD communication and the HD communication.

In a second way, the traffic measurement data may be obtained or retrieved, i.e. measured, from a database or a memory accessible by the first network node. In typical communication situations, many user settings, transmission settings and/or communication settings for each of the UE's are stored in a database or a memory. The first network node may measure, i.e. obtain, the required traffic measurement data related to in-band full duplex, FD, communication and related to half duplex, HD, communication directly from this memory and/or database.

In an example, the radio operation task is any of a cell change of any UE between said first and said second cell, a handover of any UE between said first and said second cell, scheduling or resource assigning, by said second network node, any of said second plurality of UE's in said second cell, load balancing, by said second network node, in said second cell, network planning or tuning, by said second network node, of network parameters, controlling uplink and/or downlink power, by said second network node, for said second plurality of UE's in said second cell, avoiding and/or mitigating, by said second network node, interference.

The second network node may receive the FD and HD measurement related information in any one or more of the following manners: periodically, on event triggered basis, e.g. when certain measurement exceeds a threshold or falls below a threshold, and in response to a request sent to the first network node by the second network node.

The second network node uses the received information about the FD and HD measurements for one or more radio resource measurement, RRM, tasks, i.e. radio operation tasks. The second network node may also combine the information received from two or more types of first network nodes and apply the combined results for the radio operation tasks. The radio operation task may be related to the operation of one or a plurality of UEs or related to the radio network planning or management. Examples of such tasks are cell change such as handover, admission control, load balancing or load management across different cells served by the second network node, planning of network, tuning of parameters, Uplink, UL, and/or Downlink, DL, power control or power adjustment, maximum power allocation in UL and/or DL, interference avoidance and interference mitigation, inter-cell interference coordination, ICIC, etc., or a combination of any of the above.

In a further example, the method further comprises the step of transmitting, by said second network node, said traffic measurement data to any of said second plurality of UE's.

In this step a UE receives from the second network node the information related to the FD and HD measurements performed by the first network node as described above. The UE may also receive information related to the FD and HD measurements performed by other network nodes e.g. network nodes serving other serving cells of the UE in multi-carrier operation aka carrier aggregation, network nodes neighbour to the second network node etc. The UE may receive the information from the network node via UE specific channel and/or by acquiring system information which is sent on a common channel such as broadcast channel.

The second network node may transmit information about FD and HD communications on the radio interface, e.g. via RRC, for use by the UE in any one or more of the following manners: periodically, on event triggered basis, e.g. when certain measurement exceeds a threshold or falls below a threshold, and in response to a request received from the UE.

The UE is able to use the received information for one or more UE specific radio operation tasks. One example of such a task is adaptation of cell reselection. For example, if traffic load on FD radio resource in the serving cell is high, e.g. FD resource usage is above a certain predetermined threshold, and the UE is also operating on FD radio resources, then the UE may decide to perform cell change, e.g. cell reselection, to another cell in which at least the traffic load on FD resources is less high, e.g. FD resource usage is not larger than the threshold. An FD radio resource may refer to a radio resource that is currently used by two transmitters simultaneously according to the FD principle or a radio resource that is reserved for FD transmissions.

Examples of UE are any type of wireless communication device, communication device, Device-to-Device, D2D, UE capable of D2D operation, wireless modem, smart phone, machine type, MTC, device, aka machine to machine, M2M, device, PDA, Tablet, laptop embedded equipped, LEE, laptop mounted equipment, LME, USB dongles etc.

Another example of such a task is adaptation of UE radio receiver for receiving radio signals on HD and/or FD radio resources. Examples of such adaptation are selecting one or more receiver types out of plurality of receiver types supported by the UE. For example the UE may use a more robust receiver for receiving signals on FD radio resource if the resource utilization and/or number of active UEs or radio bearers in the first cell are above their respective thresholds. The more robust receiver more effectively mitigates interference compared to the receiver which is less robust. This allows the network node to serve the UE using higher modulation and coding scheme (MCS) over fewer physical channels e.g. 1-2 RBs. In this way more UEs can be served when traffic load is high. An example of higher MCS comprises of 64 QAM modulation and code rate of ¾, and an example of lower MCS comprises of QFSK QAM modulation and code rate of ½.

Yet another example of such a task is adaptation of UE radio transmitter for transmitting radio signals on HD and/or FD radio resources. Examples of such adaptation are adjustment of uplink transmit power e.g. transmitting signals with lower power in case BS uplink user throughput and/or cell throughput are below their respective thresholds etc.

A further example of a radio operation task is adaptation of FD and HD mode of operation. For example if traffic load on FD radio resource is above a threshold then the UE may decide not to use FD on that radio resource.

Another example of a radio operation task is adaptation of UE radio receiver for receiving radio signals on HD and/or FD radio resources. Examples of such adaptation are selecting one or more receiver types out of plurality of receiver types supported by the UE. For example the UE may use a more robust receiver for receiving signals on FD radio resource if the BS transmits power is below a threshold and/or interference is above a threshold and/or signal quality is below a threshold etc. The more robust receiver more effectively mitigates interference compared to the receiver which is less robust. Adjustment of one or more parameters of a particular type of UE radio receiver for receiving signals on HD and/or FD communication. For example the UE may adapt the number of receive antenna branches (e.g. between 1-4 branches) for receiving radio signals on a radio resource depending upon signal quality of that radio resource estimated by the network node.

Yet another example of such a radio operation task is adaptation of UE radio transmitter for transmitting radio signals on HD and/or FD radio resources. Examples of such adaptation are adjustment of uplink transmit power e.g. transmitting signals with higher power in case BS uplink received signal quality is below a threshold etc., adaptation of number of transmit antenna branches (e.g. between 1-4 branches) for transmitting radio signals on a radio resource depending upon UL signal quality on that radio resource estimated by the network node. For example if signal quality on FD radio resource is below a threshold then the UE may decide not to use FD on that radio resource.

In another aspect, there is provided a method of enabling a second network node serving a second plurality of User Equipment, UE's, in a second cell of a telecommunication network to perform at least one radio operation task involving a UE among said second plurality of UE's, said telecommunication network further comprising a first network node serving a first plurality of UE's in a first cell, wherein said first network node is capable of in-band full duplex, FD, communication and half duplex, HD, communication with any of said first plurality of UE's, wherein in-band FD communication being the simultaneous transmission and reception of signals on a same frequency.

Here, the method comprises the steps of measuring, by said first network node, traffic measurement data related to in-band full duplex, FD, communication between any of said first plurality of UE's in said first cell and said first network node, measuring, by said first network node, traffic measurement data related to half duplex, HD, communication between any of said first plurality of UE's in said first cell and said first network node.

Here, the traffic measurement data comprises at least one of the number of active channels used for communication in said first cell and physical channel usage or utilization of channels used for communication in said first cell.

The method further comprises the step of providing, by said first network node, said traffic measurement data related to said in-band full duplex, FD, communication and said half duplex, HD, communication to said second network node enabling said second network node to use said data for performing said at least one radio operation task involving said UE among said second plurality of UE's in said second cell.

It is an insight that network nodes should communicate information relating to in-band full duplex, FD, measurements and half duplex, HD, measurements to each other in order to improve the quality and the reliability of the radio operation tasks to be performed. The measurements may be used as an input by the second network node to determine which, and how, the radio operation tasks should be performed. This increases the efficiency of the telecommunication network as a whole.

As mentioned before, the network nodes can be any of a radio base station, access point, wireless access point, eNodeB, relay, base transceiver station, transmission point, transmission nodes, remote radio unit, remote radio head, nodes in distributed antenna system, radio network controller, base station controller etc.

In another example, the second network node is directly adjacent to said first network node such that said first cell is directly adjacent to, or party overlapping with, said second cell.

Following the present disclosure, a further advantage of the presented method over prior art techniques is that it allows a second network node to receive distinct measurements on FD and HD radio bearers, i.e. traffic measurement data, from a first network node, or any other neighbouring network node, and thereby it can take action on radio resource management of its own FD or HD radio bearers. That is, the second network node is able to, more accurately, decide which radio operation task it should perform as it can base the decision on the traffic measurement data provided by the first network node.

For example a network node, e.g. an eNB, can use the of measurements and X2AP information elements to report to neighbours concerning the total received power and/or Signal to Interference, SI, and/or SI-to-total-received-power ratio that the eNB measures on radio bearers used for FD communication, as well as UE reported total received power or received power from a specific UE on radio bearers used for FD communication by HD capable UE pairs.

In another example the method further comprises the initial step of receiving, by said first network node, from said second network node, a request for traffic measurement data related to relating to said in-band full duplex, FD, communication and said half duplex, HD, communication between any of said first plurality of UE's in said first cell and said first network node.

The advantage of this example is that it reduces the total load on the telecommunication network. That is, the first network node does not need to consistently and continuously provide the traffic measurement data, for example periodically, but only on request by the second network node. As such, the traffic measurement data is only sent when the second network node needs it for determining which, and how the radio operation tasks are to be performed.

In another example, each of the steps of measuring comprises any of averaging said measurement over a plurality of radio frames, performing said measurement on any of a symbol, time slot or subframe basis of said communication between said first network node and any of said first plurality of UE's.

In a further example, the traffic measurement data further comprises any of throughput data, bit rate data, number of said first plurality of UE's, amount of data in a buffer of said first network node for transmission in said first cell, reserved radio resources such as resources reserved for half duplex, HD, communication in uplink and/or downlink in said first cell, and reserved radio resources reserved for in-band full duplex, FD, communication in said first cell.

In an example, the method further comprises the step of transmitting, by said first network node, said traffic measurement data to any of said first plurality of UE's.

In accordance with the present disclosure, also radio measurement data may be measured, wherein said radio measurement data comprises any of signal quality measurement data such as Signal-to-Noise ratio, SNR, data, Signal-to-interference-plus-noise, SINR, ratio, or Block Error Rate data, interference measurement data such as overload indication, interference indicator, Rise over Thermal, ROT, or received interference power, RIP, and transmit power data such as transmit carrier power, transmit power per physical channel, reference signal transmit power or relative transmit power.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the first network node, the second network node as well as the telecommunication network according to the present disclosure.

In a third aspect, there is provided a method of performing at least one radio operation task involving a UE among a second plurality of UE's served by a second network node in a telecommunication network, said telecommunication network further comprising a first network node serving a first plurality of UE's in a first cell.

The method comprises the steps of receiving, by said second network node, from a first network node, traffic measurement data related to relating to said in-band full duplex, FD, communication and said half duplex, HD, communication, wherein in-band FD communication being the simultaneous transmission and reception of signals on a same frequency. Here, the traffic measurement data comprises at least one of the number of active channels used for communication in said first cell and the physical channel usage or utilization of channels used for communication in said first cell.

The method further comprises the steps of determining, by said second network node, based on said received traffic measurement data at least one UE among said second plurality of UE's to with which said radio operation task is to be performed, and performing, by said second network node, said radio operation task involving said at least one UE.

Here the radio operation task can be at least one of a cell change of any UE between said first and said second cells, a handover of any UE between said first and said second cell, load balancing between said first and said second cell, resource partitioning for assigning resources for in-band full duplex and half duplex operations, interference mitigation in said second cell, scheduling in said second cell, admission control in said second cell, and power control in said second cell.

In a fourth aspect, there is provided a first network node arranged to enable a second network node serving a second plurality of User Equipment, UE's, in a second cell of a telecommunication network to perform a radio operation task involving a UE among said second plurality of UE's, said first network node serving a first plurality of UE's in a first cell, wherein said first network node is capable of in-band full duplex, FD, communication and half duplex, HD, communication with any of said first plurality of UE's, wherein in-band FD communication being the simultaneous transmission and reception of signals on a same frequency.

The first network node comprises in-band full duplex, FD, measure equipment arranged for measuring traffic measurement data related to in-band full duplex, FD, communication between any of said first plurality of UE's in said first cell and said first network node, half duplex, HD, measure equipment arranged for measuring traffic measurement data related to half duplex, HD, communication between any of said first plurality of UE's in said first cell and said first network node, wherein said traffic measurement data comprises, for example, at least one of a number of active channels used for communication in said first cell, and physical channel usage or utilization of channels used for communication in said first cell.

The first network node further comprises transmit equipment arranged for providing said traffic measurement data related to said in-band full duplex, FD, communication and said half duplex, HD, communication to said second network node enabling said second network node to use said data for performing a radio operation task involving a UE among said second plurality of UE's in said second cell.

In an example, the first network node further comprises receive equipment arranged for receiving, from said second network node, a request for traffic measurement data related to relating to said in-band full duplex, FD, communication and said half duplex, HD, communication between any of said first plurality of UE's in said first cell and said first network node.

In a fifth aspect, there is provided a second network node arranged for performing a radio operation task involving a UE among a second plurality of UE's served by said second base in a telecommunication network, said telecommunication network further comprising a first network node serving a first plurality of UE's in a first cell, said second network node comprising receive equipment arranged for receiving, from a first network node, traffic measurement data related to relating to said in-band full duplex, FD, communication and said half duplex, HD, communication, wherein said traffic measurement data comprises, for example, at least one of a number of active channels used for communication in said first cell, and the physical channel usage or utilization of channels used for communication in said first cell.

The second network node further comprises process equipment arranged for determining, based on said received traffic measurement data at least one UE among said second plurality of UE's in said second cell for performing said radio operation task, and perform equipment arranged for performing, by said second network node, said radio operation task involving said determined at least one UE.

In a sixth aspect, there is provided a non-transitory computer-readable storage medium, comprising instructions which, when executed on at least one processor, cause the at least one processor to carry out the method according to any of the examples as described above.

In a seventh aspect, there is provided a telecommunication network arranged for enabling a second network node serving a second plurality of User Equipment, UE's, in a second cell of a telecommunication network to perform a radio operation task involving a UE among said second plurality of UE's, said telecommunication network further comprising a first network node serving a first plurality of UE's in a first cell, wherein said first network node is capable of in-band full duplex, FD, communication and half duplex, HD, communication with any of said first plurality of UE's, said telecommunication network comprising a first network node according to any of the examples as provided above and a second network node according to any of the examples as provided above.

In an eight aspect, there is provided a first network node for enabling a second network node serving a second plurality of User Equipment, UE's, in a second cell of a telecommunication network to perform a radio operation task involving a UE among said second plurality of UE's, said first network node serving a first plurality of UE's in a first cell, wherein said first network node is capable of in-band full duplex, FD, communication and half duplex, HD, communication with any of said first plurality of UE's, wherein in-band FD communication being the simultaneous transmission and reception of signals on a same frequency, said first network node comprising in-band full duplex, FD, measure module for measuring traffic measurement data related to in-band full duplex, FD, communication between any of said first plurality of UE's in said first cell and said first network node, half duplex, HD, measure module for measuring traffic measurement data related to half duplex, HD, communication between any of said first plurality of UE's in said first cell and said first network node, wherein said traffic measurement data comprises, for example, at least one of the number of active channels used for communication in said first cell, and the physical channel usage or utilization of channels used for communication in said first cell, and a transmit module for providing said traffic measurement data related to said in-band full duplex, FD, communication and said half duplex, HD, communication to said second network node enabling said second network node to use said data for performing said radio operation task involving said UE among said second plurality of UE's in said second cell.

In a ninth aspect, there is provided a second network node for performing a radio operation task involving a UE among a second plurality of UE's served by said second base in a telecommunication network, said telecommunication network further comprising a first network node serving a first plurality of UE's in a first cell, said second network node comprising a receive module for receiving, from a first network node, traffic measurement data related to relating to said in-band full duplex, FD, communication and said half duplex, HD, communication, wherein said traffic measurement data comprises, for example, at least one of the number of active channels used for communication in said first cell, and physical channel usage or utilization of channels used for communication in said first cell, and a process module for determining, based on said received traffic measurement data at least one UE among said second plurality of UE's in said second cell which is to be handed over to said first network node, and perform equipment arranged for performing, by said second network node, a radio operation task involving said at least one UE from said second network node to said first network node.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
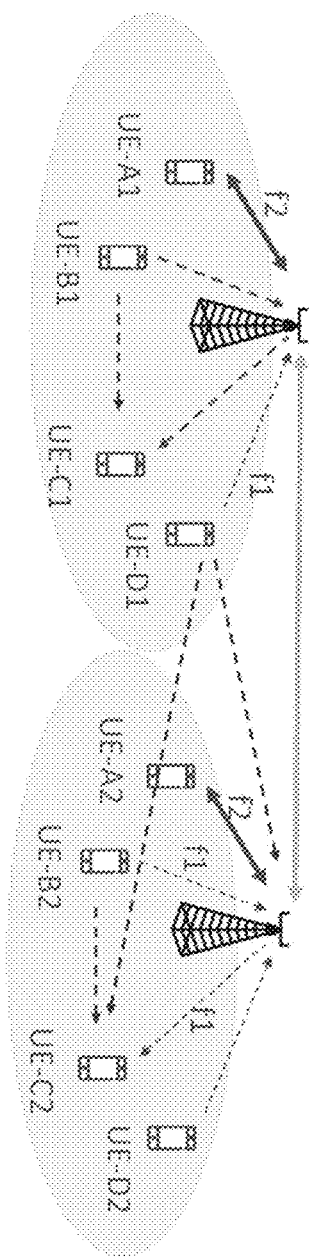
FIG. 1 is a schematic diagram illustrating two network nodes in which an underlying problem of the present disclosure is depicted.

FIG. 1 is a schematic diagram illustrating two network nodes in which the underlying problem of the present disclosure is depicted.

In the situation sketched by FIG. 1, a first network node 2 is serving a first plurality of User Equipment, UE's, 6, 7, 8, 9 in a first cell 4 and a second network node 3 is serving a second plurality of UE's 12, 14, 15, 16 in a second cell 5.

Here, a cellular system 1 is shown in which a first network node 2 is capable of in-band full duplex communication, and at least some of the first plurality of User Equipment, UE's, 7, 8, 9 are only half duplex capable, Notice that the uplink transmission of UE-D1 9 on a first frequency f1 11 causes interference both at a second network node 3 and, alternatingly, at UE-B2 14 and UE-C2 15. In the second cell 5, UE-B2 14 and UE-C2 15 use FD communication to alternatingly send and receive data to/from the second network node 3 on a first frequency f1 17.

We consider the multi-cell scenario of FIG. 1, in which both the first network node 2 and the second network node 3 are FD capable, whereas some of the plurality UE's are HD capable only, i.e. a Three Node Full Duplex, TNFD scenario. In HD operation, a particular UE does not transmit and receive at the same time. Examples of HD modes are FDD-HD, TDD-HD etc. FD capable UEs can also be configured to operate in any of the HD modes supported by the UE.

In one exemplary TNFD arrangement, a first FD capable network node 2 receives radio signals from a first UE on carrier frequency, f1 while at the same time also transmits radio signals to a second UE on the same carrier frequency, f1. In this example, the first UE and the second UE operate in HD communication mode. Also, in this particular example, the first network node 2, the first UE and the second UE are considered to operate in the TNFD scenario. The first FD network node 2 may also communicate with a second network node 3 over an interface e.g. like X2. The second network node 3 may or may not be FD capable.

FIG. 1 illustrates two types of interference. Intra-cell interference is a consequence of full duplex scheduling of two HD capable UE's, e.g. UE-B1 7 and UE-C1 8, sharing the same time-frequency resource. Although FD scheduling is transparent for the HD capable UE-B1 7 and UE-C1 8, UE-C1 8 can experience heavy interference when receiving the signal from the first network node 2 due to UE-UE interference.

The second type is inter-cell interference, whose impact is different on HD and FD radio bearers. For example, UE-D1 9 can exacerbate the impact of self-interference due to the FD scheduling of UE-A2 12 on a second frequency f2 13. As shown in FIG. 1, in a FD cellular system, there can be three types of radio bearers, RB's. The traditional RB's are either uplink or downlink bearers, e.g. UE-D1 9. FD allows UE pairs, e.g. UE-B1 7 and UE-C1 8, consisting of HD capable UE's to be jointly scheduled for FD communication, TNFD. Finally, FD bearer for a single FD capable UE, e.g. UE-A1 6, allows the simultaneous transmission/reception for a single UE. As exemplified in FIG. 1, the coexistence of these three types of bearers gives rise to new types of interference.

Figure 2:
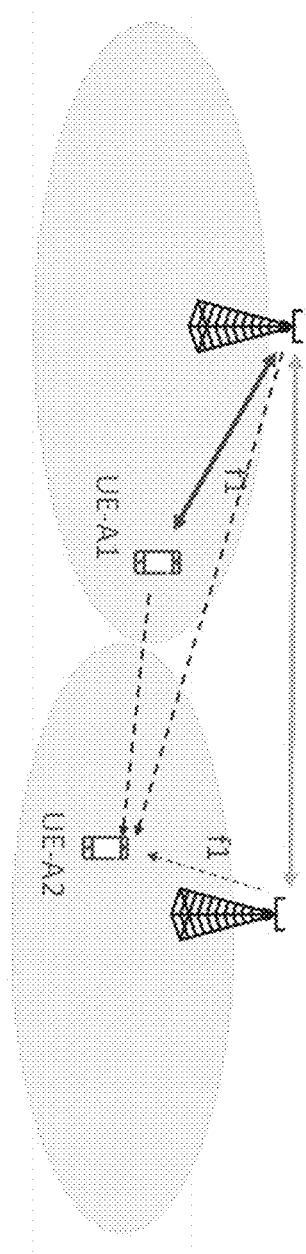
FIG. 2 is a further schematic diagram illustrating two network nodes in which an underlying problem of the present disclosure is depicted.

FIG. 2 is a further schematic diagram illustrating two network 102, 103 nodes in which an underlying problem of the present disclosure is depicted. Here, the first network node 102 is serving UE's 105 in a first cell 111 and the second network node 103 is serving UE's 110 in a second cell 112, and communication 103 may be present between the network nodes 102, 103.

FIG. 2 shows an FD system 101, wherein the inter-cell interference power on a given frequency f1 106, 108, 109 can be caused by two interference sources. In the particular example the first network node 102 and UE-A1 105 both cause interference to UE-A2 110 on f1.

Notice that the intercell interference power 107, 108 can be caused by two sources and thereby the intercell interference can be significantly higher than in a HD network. This is because in a HD network the intercell interference is caused by a single transmitter per neighbour cell, whereas in a FD network intercell interference can be caused by both one of the network nodes 102, 103 and any of the UE's 105, 110 as shown in FIG. 2. The probability of at least one of these interference power levels being extremely high at the victim nodes is high due to the fact that the interference is caused by multiple and spatially separated transmitters.

Figure 3:
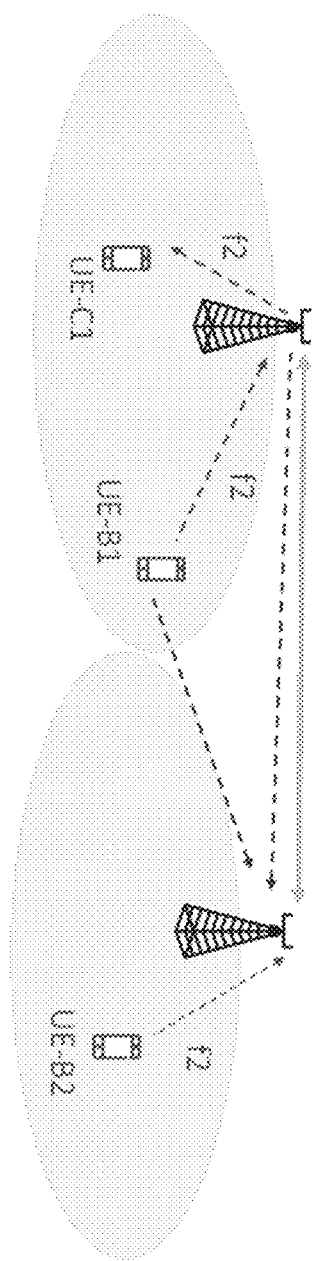
FIG. 3 is another schematic diagram illustrating two network nodes in which an underlying problem of the present disclosure is depicted.

FIG. 3 is another schematic diagram illustrating two network nodes 102, 103 in which an underlying problem of the present disclosure is depicted. Here, a network node 102, 103 can receive interference from both another network node 103, 102 and any of the UE's 202, 205, 209. In the present example, each of the UE's 202, 205, 209 are operating the same frequency f2 203, 204, 208, 206.

Figure 4:
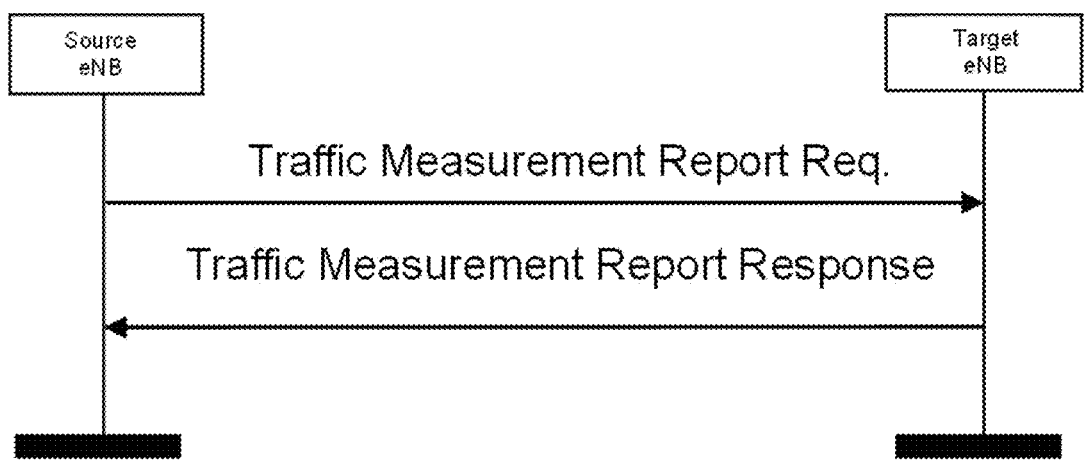
FIG. 4 is a flow chart illustrating two steps of a method according to the present disclosure.

FIG. 4 is a flow chart 301 illustrating two steps of a method according to the present disclosure.

As described before, in FD capable cellular networks there are new types of radio bearers and also new types of interference. Therefore, FD and HD measurements done on radio resources carrying FD and HD radio bearers respectively may require new sets of signaling information element, IE, for transmitting the information related to the measurement results to other network nodes. The new information elements, e.g. new X2AP between eNBs in Long Term Evolution, LTE, would enable the first network node 102 to transmit 302 HD and/or FD traffic measurement related information, i.e. traffic measurement data, to one or more second network nodes 103 and may, subsequently, be acknowledged 303, by the second network node 103.

The first network node 102 may also fully operate in HD operation, i.e. legacy operation, in which case it may use the existing IE's to transmit the HD measurement related information, i.e. traffic measurement data, to one or more second network nodes 103. Therefore, a first network node will be capable of transmitting HD traffic measurements using existing IEs under full HD operation and also capable of transmitting FD and HD traffic measurements using new IEs when radio resources are partitioned between HD and FD communications.

Specifically, the following actions may be performed in the first network node 102:

Each of the HD and FD traffic measurements performed may be tagged or associated with its respective 'resource identifier' i.e. HD and FD traffic measurements with HD resource ID and FD resource ID respectively. This allows the target network node, i.e. second network node 103, or any of the UE's to determine whether that traffic measurement and/or resource status reporting is done by the source network node, i.e. first network node 102, on HD or FD radio resources.

One or more HD and FD traffic measurement results along with at least the resource ID are transmitted to at least one second network node 103 and/or one or more UEs. Alternatively or additionally the information associated with the actual traffic measurement results is transmitted to the second network node 103. Examples of such information are indicators, such as on scale between 0-9 or in percentage, depicting traffic load on HD or FD resources in the cell. The cell load in turn can be derived based on traffic measurements such as user bit, cell bit rate, user throughput, etc.

One or more HD and FD traffic measurement results are internally used by the first network node 102 for one or more radio operation tasks. Examples of such tasks are scheduling, load balancing, partitioning of radio resources for FD and HD communications, etc.

Figure 5:
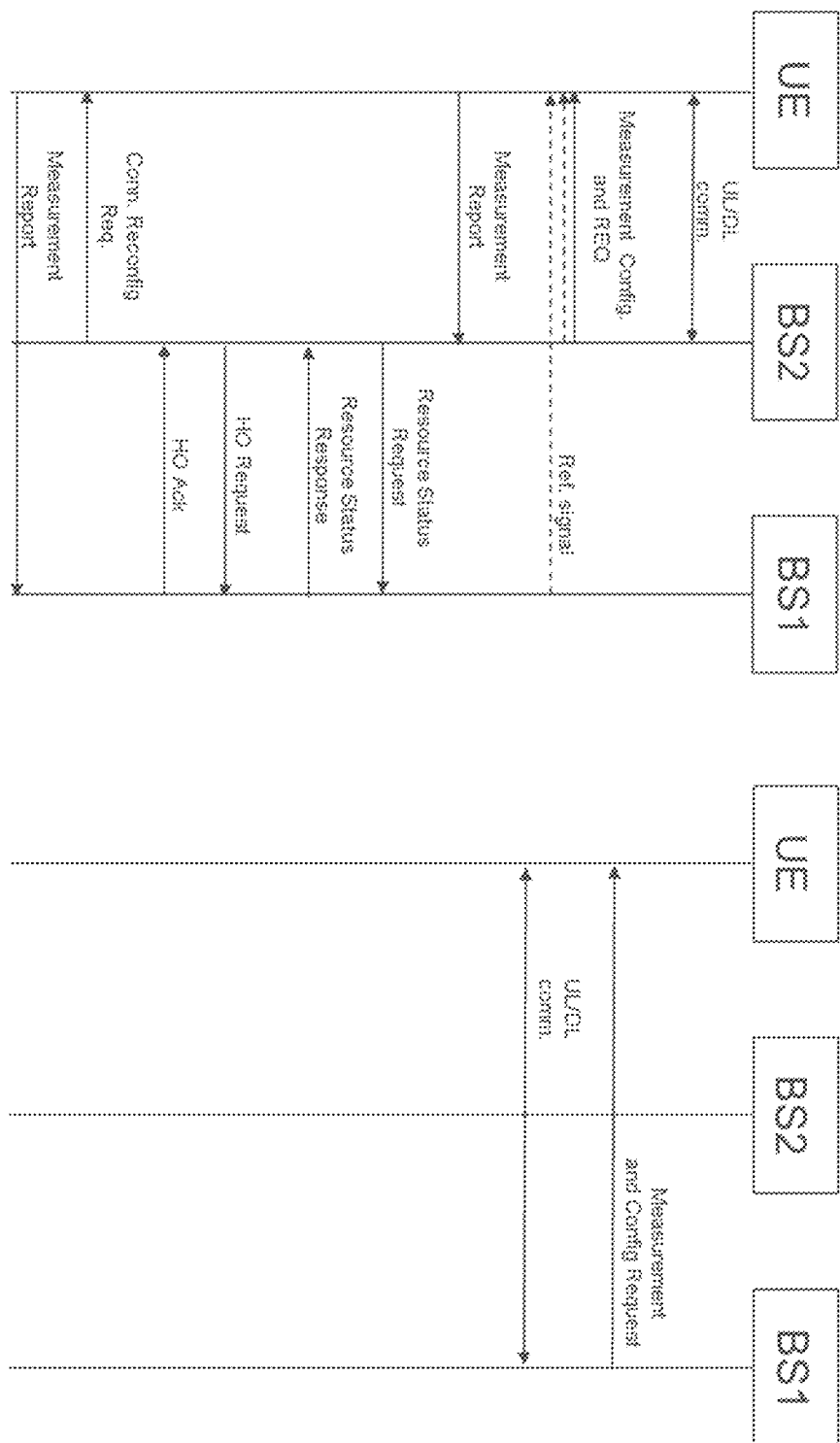
FIG. 5 is a signaling diagram illustrating an exchange of signals between two network nodes and a UE.

FIG. 5 is a signaling diagram illustrating an exchange of signals between two network nodes and a UE.

Here, in the first step 408, the UE 402 communicates with its serving network node, i.e. base station 403. There is ongoing UL/DL communications 408 between the UE 402 and the base station 403. This UE 402 may be a HD capable UE, but co-scheduled with another UE on the same radio resource, i.e. three-node full duplex scenario as described above, or it can be a FD capable UE 402 using FD communications with its base station 403.

Subsequently, the base station 403 sends 409 a measurement configuration and request message to the UE 402. This message may request measurements performed by the UE related to traffic measurement data or radio measurement data. For example, the UE 402 may report the measured DL/UL user plane throughput, average and peak bit rates over a past time window and measured signal strength on specific radio resource blocks (channels). It may also request the UE 402 to perform FD specific measurements, e.g. experienced signal strength from a specific other UE 402 with which the UE is co-scheduled for three-node full duplex communication or experienced self-interference level during a past time window, etc.

The base station 403 knows whether the UE 402 is scheduled for HD, bidirectional FD or three-node FD communication and so it can instruct and configure the UE 402 to perform HD, bidirectional FD and three-node FD measurements.

Note that as part of this configuration, the base station 403 can specify thresholds on certain measurement values that must be met in order for the UE 402 to actually send a measurement report. For example, if the experienced UE-to-UE interference or the received signal-to-(UE-to-UE interference) level is higher than a certain predetermined threshold, the UE 402 should send a certain type of measurement report.

Note that the FD specific measurements, e.g. measured experienced self interference or UE-to-UE interference are FD specific and require from the UE 402 that such measurements can be performed and reported.

In a third step, the UE 402 sends 410 the measurement report, i.e. at least the measurement data, to the serving base station 403 according to the instructions and thresholds of the previous step. This measurement can be traffic or radio related. Note that the BS knows certain traffic measurements by itself, e.g. sent or received data packets peak/average rate on UL/DL on the radio resource used jointly by bidirectional or three-node FD UEs.

The base station then uses these measurements to decide on requesting a handover for the UE 402 to another base station 404. For example, if the reported signal-to-(UE-to-UE interference) is lower than threshold and the UE 402 reports higher than threshold reference signal measured from the base station 404, the serving base station 402 decides to hand over the UE 402 to that base station 404. Thus, base station 404 combines FD specific measurements with reference signal measurements.

The base station 403 issues 411 a resource status request to the other base station 404. This requires, for example, X2 signaling and may involve traffic or radio signal related measurements per radio channel or on an aggregate of radio channels, resource blocks. For example, the base station 403 may request the load level on resources used for HD, bidirectional FD and three-node FD communications, interference or overall signal strength measurements on such resource blocks.

Then, the base station 404 may respond 412 with the 'Resource Status Response' message. This message may contain traffic and radio signal related measurements. The base station 403 then issues 413 a HandOver, HO, request message for the UE 402. In this HO request message, the base station 403 can optionally indicate that the UE 402 has been served in HD, bidirectional-FD or three-node-FD mode. It may also include some other detail parameters, such as the self-interference suppression capability if the UE 402 is bidirectional-FD capable.

If the base station 404 can accommodate the HO request, it will send 414 a HO Ack to the base station 403. Optionally, it may send other parameters such as that the UE 402 will be scheduled on HD or FD resources after HO or if it will be scheduled on bidirectional FD or 3-node FD mode. Such information may be useful for the UE 402 to configure its receiver in advance for self-interference suppression. Also, the base station 404 may send measurement configuration information that the UE shall use after handing over to the base station 404.

Then, based on the received information, the base station 403 issues 415 a Connection Reconfiguration Message to the UE 402. In this message the base station 403 provides information on how the UE 402 should reconfigure its connection when it connects to the base station 404. This may help the UE 402 to maintain Quality-of-Service during and after the HO. For example, if the UE 402 knows that it will be scheduled on a FD resource, it may decide to use a more robust modulation and coding scheme than it would use on an orthogonal, i.e. dedicated, resource.

Finally, the UE 402 starts 416 sending measurement reports, i.e. traffic measurement data, to the base station 404. This measurement report uses the configuration information that the UE received from the initial base station 403.

In the right part of the figure, similar steps 417, 418 as described above are described with respect to the UE 405 which is served by the base station 407 instead of the base station 406.

Figure 6:
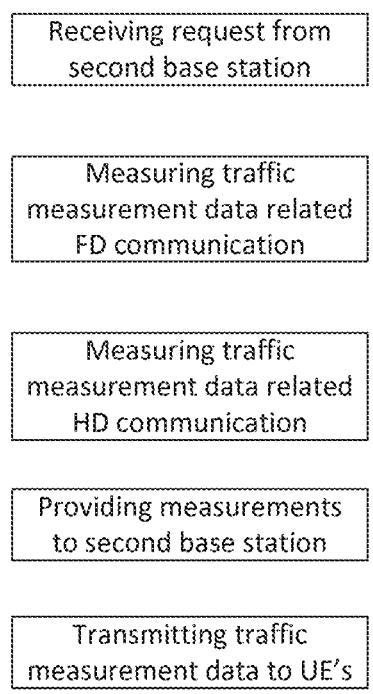
FIG. 6 is a schematic diagram illustrating an embodiment of the method steps.

FIG. 6 is a schematic diagram illustrating an embodiment of the method steps.

Here, a method 501 is shown of enabling a second network node serving a second plurality of User Equipment, UE's, in a second cell of a telecommunication network to perform at least one radio operation task involving a UE among said second plurality of UE's, said telecommunication network further comprising a first network node serving a first plurality of UE's in a first cell, wherein said first network node is capable of in-band full duplex, FD, communication and half duplex, HD, communication with any of said first plurality of UE's, wherein in-band FD communication being the simultaneous transmission and reception of signals on a same frequency.

Initially, the first network node receives 502, from said second network node, a request for traffic measurement data related to relating to said in-band full duplex, FD, communication and said half duplex, HD, communication between any of said first plurality of UE's in said first cell and said first network node.

The method further comprises the step of measuring 503, by said first network node, traffic measurement data related to in-band full duplex, FD, communication between any of said first plurality of UE's in said first cell and said first network node.

Then, the first network node measures traffic measurement data related to half duplex, HD, communication between any of said first plurality of UE's in said first cell and said first network node, wherein said traffic measurement data comprises, for example, at least one of the number of active channels used for communication in said first cell and physical channel usage or utilization of channels used for communication in said first cell.

Subsequently, the first network node provides 302 said traffic measurement data related to said in-band full duplex, FD, communication and said half duplex, HD, communication to said second network node enabling said second network node to use said data for performing said at least one radio operation task involving said UE among said second plurality of UE's in said second cell. Finally, and optionally, the traffic measurement data may be transmitted 506 to the UE's itself.

Figure 7:
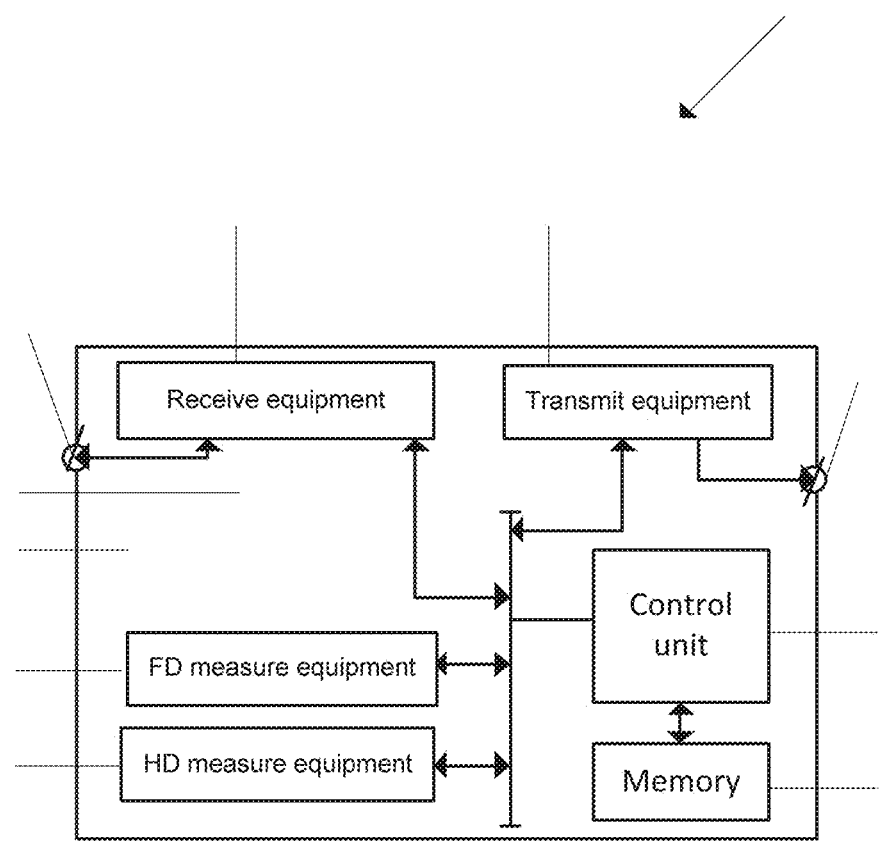
FIG. 7 is a schematic diagram illustrating an embodiment of a first network node.

FIG. 7 is a schematic diagram illustrating an embodiment of a first network node 102 arranged to enable a second network node serving a second plurality of User Equipment, UE's, in a second cell of a telecommunication network to perform a radio operation task involving a UE among said second plurality of UE's, said first network node serving a first plurality of UE's in a first cell, wherein said first network node is capable of in-band full duplex, FD, communication and half duplex, HD, communication with any of said first plurality of UE's, wherein in-band FD communication being the simultaneous transmission and reception of signals on a same frequency.

The first network node 102 comprises in-band full duplex, FD, measure equipment 607 arranged for measuring traffic measurement data related to in-band full duplex, FD, communication between any of said first plurality of UE's in said first cell and said first network node, and half duplex, HD, measure equipment 608 arranged for measuring traffic measurement data related to half duplex, HD, communication between any of said first plurality of UE's in said first cell and said first network node.

Further, transmit equipment 603 is provided, arranged for providing said traffic measurement data related to said in-band full duplex, FD, communication and said half duplex, HD, communication to said second network node enabling said second network node to use said data for performing a radio operation task involving a UE among said second plurality of UE's in said second cell.

Here, incoming data packets or messages pass through the input terminal 604 before they reach the receive equipment 602, or receiving module. Outgoing data packets or messages pass or are sent by the transmit equipment 603, or transmit module, via the output terminal 609.

The first network node 102 comprises a control unit 610 and a memory 611, which control unit 610 is connected to the transit equipment 603, the receive equipment 602, the FD measure equipment 607 and the HD measure equipment 608. The control unit 610 may be arranged to instruct the in-band FD measure equipment 607 as well as the HD measure equipment 608 to start the measurement process, and to compile an X2 message having said traffic measurement data related to the in-band FD communication and related to the HD communication, which X2 messages is then to be provided, i.e. transmitted, to the second network node using the transmit equipment 603.

Figure 8:
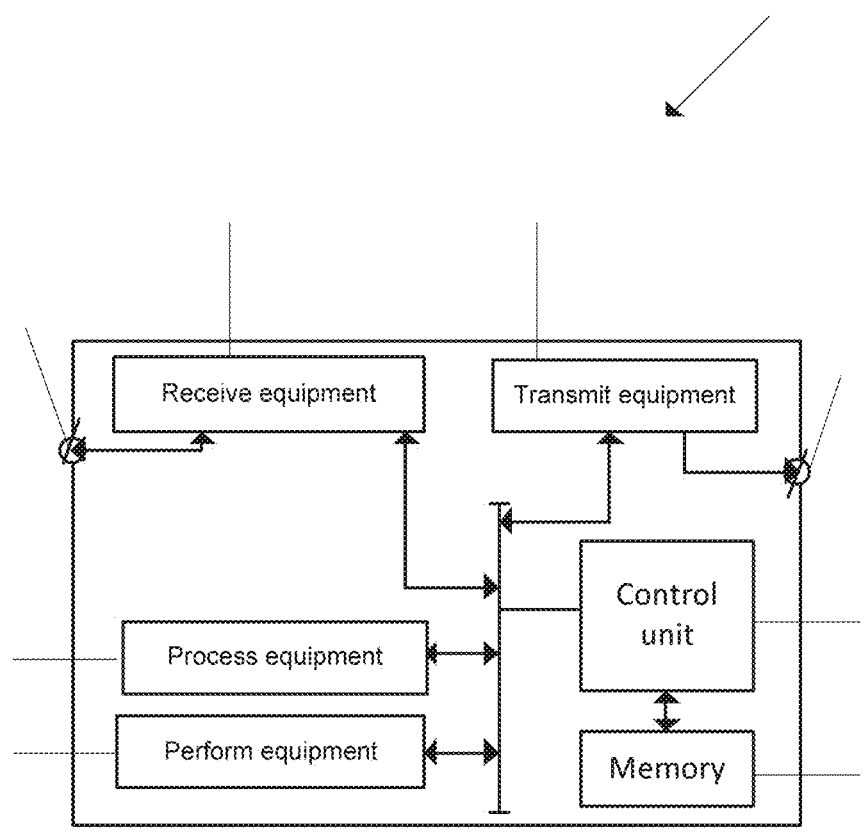
FIG. 8 is a schematic diagram illustrating an embodiment of a second network node.

FIG. 8 is a schematic diagram illustrating an embodiment of a second network node arranged for performing a radio operation task involving a UE among a second plurality of UE's served by said second base in a telecommunication network, said telecommunication network further comprising a first network node serving a first plurality of UE's in a first cell.

The second network node 103 comprises receive equipment 702 arranged for receiving, from a first network node, traffic measurement data related to relating to said in-band full duplex, FD, communication and said half duplex, HD, communication, wherein said traffic measurement data comprises, for example, at least one of the number of active channels used for communication in said first cell and the physical channel usage or utilization of channels used for communication in said first cell.

Further, process equipment 705 is provided, arranged for determining, based on said received traffic measurement data at least one UE among said second plurality of UE's in said second cell for performing said radio operation task, and perform equipment 706 is provided arranged for performing, by said second network node, said radio operation task involving said determined at least one UE.

The second network node 103 comprises a control unit 708 and a memory 709, which control unit 708 is connected to the transit equipment 703, the receive equipment 702, the process equipment 705 and the perform equipment. The control unit 708 may be arranged to instruct the process equipment 705 and the perform equipment 706 to start with the determining and performing, respectively, and may control communication between these elements, for example via a communication bus.

One of the advantageous is that the second network node is able to perform proper actions, i.e. radio operation tasks, based on measurements performed by the first network node, thereby improving the overall efficiency of the telecommunication network. Table 1 below shows examples of actions that can be performed by the second network node.

TABLE 1

| Information element (received) | Examples of reactive action | Example in the present scenario |
| --- | --- | --- |
| Full Duplex Interference Overload Indication | The receiving eNB takes this message into account when setting its scheduling policy. | eNB-2 sends this IE to eNB-1 on RBs corresponding to f1, since eNB-2 experiences high interference. |
| Full Duplex High Interference Sensitivity | The receiving eNB avoids scheduling cell edge users and FD bearers on RBs indicated. | eNB-1 indicates that the RB used for scheduling UE-B1 and UE-C1 are sensitive, since these UEs are subject to self interference. |
| Full Duplex Relative Narrowband Tx Power | The receiving eNB takes this message into account when setting its scheduling policy. For example, if lower than threshold on certain RBs, then prefer those RBs for FD scheduling. | eNB-1 indicates low transmit power on the RB used for UE-A1. |
| Full Duplex Pattern Information | The receiving eNB can take this into account when setting its scheduling policy. For example, the eNB may decide to use indicated FD resource blocks for cell center UEs. | eNB-1 sends its FD pattern to eNB-2. |

FD interference overload indication, e.g. per RB, per group of RBs etc., indicates that the second network node, e.g. eNB, causes too much interference to the first network node, on for example specific RB or group of RBs. The second network node may use the received overload indication to switch from FD mode to HD mode if it is transmitting in FD mode on the specific radio resources, e.g. PRBs, to which the FD interference overload indication applies. Alternatively, if the second network node uses HD transmission on these PRBs, it may mute one or more of these RBs. In yet another alternative, if the second network node uses HD transmission on these PRBs, it may transmit with lower power to the UEs on one or more of these RB and/or configure the UEs to transmit with lower power on one or more of these RBs. This way, the interference caused to the sending network node, i.e. first network node, is reduced or avoided.

FD high interference sensitivity, e.g. per RB, is similar to the FD interference overload indication, but it can be used pro-actively rather than reactively. Specifically, the first network node can use this information element to indicate to the second network node that specific RBs will be used for scheduling low Signal-to-Noise UEs that are sensitive for high interference. The second network node may avoid scheduling cell edge UEs or FD transmissions on such PRBs.

FD relative narrowband Tx power, e.g. per RB, is used to indicate to the second network node the sum power on an RB including the two directions of an FD connection. If this sum is lower than a certain predetermined threshold, the second network nodes prefers these RBs for FD transmissions and determines the sum FD power on its scheduled radio resources, e.g. RBs, accordingly.

Full Duplex Pattern Information is an indication that can incorporate multiple RBs and can combine, per RB, information according to the above three information elements. Thus, the second network node can use this received information to determine reactively or pro-actively the set of radio resources used for FD or HD transmissions with associated maximum transmit power levels. The advantage of sending the Full Duplex Pattern Information element is to allow the second network node to process a full set, over a large number of RBs, of information and decide on an overall scheduling and power control pattern rather than treating radio resources individually.

Another advantage of the present disclosure is that, due to the signaling between the two network nodes, a more efficient planning or distribution of allocated channels, frequencies, can be obtained.

Yet another advantage of the present disclosure is that already existing protocols, like the X2 application protocol, can be used for communicating the measurements between the network nodes, thereby avoiding any substantive technical amendments for realizing the present method.

The present disclosure is not limited to the embodiments as disclosed above, and can be modified and enhanced by those skilled in the art beyond the scope of the present disclosure as disclosed in the appended claims without having to apply inventive skills.

The invention claimed is:

1. A method of enabling a second network node serving a second plurality of User Equipments (UEs) in a second cell of a telecommunication network to perform at least one radio operation task involving a UE among said second plurality of UEs, said telecommunication network further comprising a first network node serving a first plurality of UEs in a first cell, wherein said first network node is capable of in-band full-duplex (FD) communication and half-duplex (HD) communication with any of said first plurality of UEs, wherein in-band FD communication comprises the simultaneous transmission and reception of signals on a same frequency, said method comprising the steps of:

measuring, by said first network node, traffic measurement data related to in-band FD communication between any of said first plurality of UEs in said first cell and said first network node;

measuring, by said first network node, traffic measurement data related to HD communication between any of said first plurality of UEs in said first cell and said first network node, providing, by said first network node, said traffic measurement data related to said in-band FD communication and said HD communication to said second network node, enabling said second network node to use said data for performing said at least one radio operation task involving said UE among said second plurality of UEs in said second cell;

receiving, by said second network node, from said first network node, said traffic measurement data related to said in-band FD communication and said HD communication;

determining, by said second network node, based on said received traffic measurement data, said least one UE among said second plurality of UEs in said second cell for said radio operation task;

performing, by said second network node, said radio operation task for said at least one UE among said second plurality of UEs.

2. The method of claim 1, wherein said traffic measurement data comprises at least one of:

a number of active channels used for communication in said first cell; and physical channel usage or utilization of channels used for communication in said first cell.

3. The method of claim 1, wherein said radio operation task is any of:

a cell change of any UE between said first and said second cell;

a handover of any UE between said first and said second cell;

scheduling or resource assigning, by said second network node, any of said second plurality of UEs in said second cell;

load balancing, by said second network node, in said second cell;

network planning or tuning, by said second network node, of network parameters;

controlling uplink and/or downlink power, by said second network node, for said second plurality of UEs in said second cell; and avoiding and/or mitigating, by said second network node, interference.

4. The method of claim 1, further comprising the step of:

transmitting, by said second network node, said traffic measurement data to any of said second plurality of UEs.

5. A method of enabling a second network node serving a second plurality of User Equipment (UEs) in a second cell of a telecommunication network to perform at least one radio operation task involving a UE among said second plurality of UEs, said telecommunication network further comprising a first network node serving a first plurality of UEs in a first cell, wherein said first network node is capable of in-band full-duplex (FD) communication and half-duplex (HD) communication with any of said first plurality of UEs, wherein in-band FD communication comprises the simultaneous transmission and reception of signals on a same frequency, said method comprising the steps of:

measuring, by said first network node, traffic measurement data related to in-band FD communication between any of said first plurality of UEs in said first cell and said first network node;

measuring, by said first network node, traffic measurement data related to HD communication between any of said first plurality of UEs in said first cell and said first network node, providing, by said first network node, said traffic measurement data related to said in-band FD communication and said HD communication to said second network node, enabling said second network node to use said data for performing said at least one radio operation task involving said UE among said second plurality of UEs in said second cell.

6. The method of claim 5, wherein said traffic measurement data comprises at least one of:
a number of active channels used for communication in said first cell; and
physical channel usage or utilization of channels used for communication in said first cell.

7. The method of claim 5, wherein said second network node is directly adjacent to said first network node such that said first cell is directly adjacent to, or party overlapping with, said second cell.

8. The method of claim 5, said method further comprising the initial step of:
receiving, by said first network node, from said second network node, a request for traffic measurement data related to said in-band FD communication and said HD communication between any of said first plurality of UEs in said first cell and said first network node.

9. The method of claim 5, wherein each of said steps of measuring comprises any of:
averaging said measurement over a plurality of radio frames; and
performing said measurement on any of a symbol, time slot or subframe basis of said communication between said first network node and any of said first plurality of UEs.

10. The method of claim 5, wherein said traffic measurement data comprises any of:
throughput data;
bit rate data;
number of said first plurality of UEs;
amount of data in a buffer of said first network node for transmission in said first cell;
reserved radio resources such as resources reserved for HD communication in uplink and/or downlink in said first cell; and
reserved radio resources reserved for in-band FD communication in said first cell.

11. The method of claim 5, further comprising the step of:
transmitting, by said first network node, said traffic measurement data to any of said first plurality of UEs.

12. The method of claim 5, wherein each of said measurement steps further measure radio measurement data, wherein said radio measurement data comprises any of:
signal quality measurement data such as Signal-to-Noise ratio (SNR) data, Signal-to-interference-plus-noise (SINR) ratio, or Block Error Rate data;
interference measurement data such as overload indication, interference indicator, Rise over Thermal (ROT), or received interference power (RIP);
transmit power data such as transmit carrier power, transmit power per physical channel, reference signal transmit power or relative transmit power.

13. A method of performing at least one radio operation task involving a user equipment (UE) among a second plurality of UEs served by a second network node in a telecommunication network, said telecommunication network further comprising a first network node serving a first plurality of UEs in a first cell, said method comprising the steps of:

receiving, by said second network node, from a first network node, traffic measurement data related to in-band full-duplex (FD) communication between any of said first plurality of UEs in said first cell and said first network node and traffic measurement data related to half-duplex (HD) communication between any of said first plurality of UEs in said first cell and said first network node, wherein in-band FD communication comprises the simultaneous transmission and reception of signals on a same frequency,
determining, by said second network node, based on said received traffic measurement data, at least one UE among said second plurality of UEs to with which said radio operation task is to be performed;
performing, by said second network node, said radio operation task involving said at least one UE.

14. The method of claim 13, wherein said radio operation task is at least one of:
a cell change of any UE between said first and said second cells;
a handover of any UE between said first and said second cell;
load balancing between said first and said second cell;
resource partitioning for assigning resources for in-band full-duplex and half-duplex operations;
interference mitigation in said second cell;
scheduling in said second cell;
admission control in said second cell, and
power control in said second cell.

15. The method of claim 14, wherein said traffic measurement data further comprises any of:
throughput data;
bit rate data;
number of said first plurality of UEs;
amount of data in a buffer of said first network node for transmission in said first cell;
reserved radio resources such as resources reserved for HD communication in uplink and/or downlink in said first cell; and
reserved radio resources reserved for in-band FD communication in said first cell.

16. The method of claim 13, wherein said traffic measurement data comprises at least one of:
number of active channels used for communication in said first cell;
physical channel usage or utilization of channels used for communication in said first cell.

17. A first network node arranged to enable a second network node serving a second plurality of User Equipment (UEs) in a second cell of a telecommunication network to perform a radio operation task involving a UE among said second plurality of UEs, said first network node serving a first plurality of UEs in a first cell, wherein said first network node is capable of in-band full-duplex (FD) communication and half-duplex (HD) communication with any of said first plurality of UEs, wherein in-band FD communication comprises the simultaneous transmission and reception of signals on a same frequency, said first network node comprising:
in-band FD measuring equipment arranged for measuring traffic measurement data related to in-band FD communication between any of said first plurality of UEs in said first cell and said first network node;
HD measuring equipment arranged for measuring traffic measurement data related to HD communication between any of said first plurality of UEs in said first cell and said first network node; and transmitter equipment arranged for providing said traffic measurement data related to said in-band full-duplex (FD) communication and said half-duplex (HD) communication to said second network node, enabling said second network node to use said data for performing a radio operation task involving a UE among said second plurality of UEs in said second cell.

18. The first network node of claim 17, wherein said traffic measurement data comprises at least one of:
   number of active channels used for communication in said first cell;
   physical channel usage or utilization of channels used for communication in said first cell.

19. The first network node of claim 17, wherein said first network node comprises:
   receiver equipment arranged for receiving, from said second network node, a request for traffic measurement data related to said in-band FD communication and said HD communication between any of said first plurality of UEs in said first cell and said first network node.

20. A second network node arranged for performing a radio operation task involving a user equipment (UE) among a second plurality of UEs served by said second base in a telecommunication network, said telecommunication network further comprising a first network node serving a first plurality of UEs in a first cell, said second network node comprising:
   a receiver configured to receive, from a first network node, traffic measurement data related to in-band full-duplex (FD) communication between any of said first plurality of UEs in said first cell and said first network node between any of said first plurality of UEs in said first cell and said first network node and traffic measurement data related to half-duplex (HD) communication; and
   a processor configured to determine, based on said received traffic measurement data, at least one UE among said second plurality of UEs in said second cell for performing said radio operation task, and to cause the second network node to perform said radio operation task involving said determined at least one UE.

21. The second network node of claim 20, wherein said traffic measurement data comprises at least one of:
   number of active channels used for communication in said first cell; and
   physical channel usage or utilization of channels used for communication in said first cell.

* * * * *